(12) United States Patent
Wang et al.

(10) Patent No.: US 12,290,950 B2
(45) Date of Patent: May 6, 2025

(54) DISPLAY PANEL AND CUTTING METHOD THEREOF, AND DISPLAY DEVICE

(71) Applicants: FUZHOU BOE OPTOELECTRONICS TECHNOLOGY CO., LTD., Fujian (CN); BOE TECHNOLOGY GROUP CO., LTD., Beijing (CN)

(72) Inventors: Jinliang Wang, Beijing (CN); Biqiang Huang, Beijing (CN); Jixiang Chen, Beijing (CN); Xin Fang, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

( * ) Notice: Subject to any disclaimer, the term of this patent is extended or adjusted under 35 U.S.C. 154(b) by 788 days.

(21) Appl. No.: 17/432,717

(22) PCT Filed: Mar. 17, 2021

(86) PCT No.: PCT/CN2021/081343
§ 371 (c)(1),
(2) Date: Aug. 20, 2021

(87) PCT Pub. No.: WO2021/203934
PCT Pub. Date: Oct. 14, 2021

(65) Prior Publication Data
US 2022/0024065 A1    Jan. 27, 2022

(30) Foreign Application Priority Data
Apr. 7, 2020 (CN) .......................... 202010266642.1

(51) Int. Cl.
*B26D 11/00* (2006.01)
*B26D 1/14* (2006.01)
(Continued)

(52) U.S. Cl.
CPC .............. *B26D 11/00* (2013.01); *B26D 1/141* (2013.01); *B29D 11/00634* (2013.01); *G02B 5/28* (2013.01); *Y10T 83/00* (2015.04)

(58) Field of Classification Search
CPC .. B26D 11/00; B26D 1/141; B29D 11/00634; G02B 5/28
(Continued)

(56) References Cited

U.S. PATENT DOCUMENTS

| 4,839,432 A | 6/1989 | Moriya et al. |
| 2012/0099056 A1 | 4/2012 | Lee et al. |

(Continued)

FOREIGN PATENT DOCUMENTS

| CN | 102390923 A | 3/2012 |
| CN | 102910809 A | 2/2013 |

(Continued)

OTHER PUBLICATIONS

Office Action dated Dec. 31, 2021, issued in counterpart CN Application No. 202010266642.1, with Search Report and English Translation. (14 pages).

*Primary Examiner* — Nhat Chieu Q Do
(74) *Attorney, Agent, or Firm* — WHDA, LLP

(57) ABSTRACT

A cutting method of a display panel comprises: along a first cutting line (A), cutting a color-film substrate of a to-be-cut display panel (501); and along a second cutting line (B), cutting an array substrate of the to-be-cut display panel to obtain a display panel; wherein, in a target direction parallel to the to-be-cut display panel, the second cutting line (B) is located between the first cutting line (A) and a display region of the to-be-cut display panel, and in the target direction, a distance between the first cutting line (A) and the second cutting line (B) is a preset distance (502).

8 Claims, 5 Drawing Sheets

(51) Int. Cl.
 *B29D 11/00* (2006.01)
 *G02B 5/28* (2006.01)
(58) Field of Classification Search
 USPC .......................................................... 83/862
 See application file for complete search history.

(56) References Cited

U.S. PATENT DOCUMENTS

| | | |
|---|---|---|
| 2013/0033672 A1 | 2/2013 | Li et al. |
| 2014/0110867 A1 | 4/2014 | Chen |
| 2015/0177557 A1* | 6/2015 | Chang ................... G02F 1/1339 |
| | | 349/122 |
| 2019/0159343 A1 | 5/2019 | Xie et al. |
| 2020/0371393 A1* | 11/2020 | Ma ....................... G02F 1/13336 |
| 2021/0255501 A1* | 8/2021 | Lo ...................... G02F 1/133351 |
| 2021/0356820 A1 | 11/2021 | Wang |

FOREIGN PATENT DOCUMENTS

| | | |
|---|---|---|
| CN | 103278952 A | 9/2013 |
| CN | 105093614 A | 11/2015 |
| CN | 106526954 A | 3/2017 |
| CN | 107067984 A | 8/2017 |
| CN | 107871679 A | 4/2018 |
| CN | 108319052 A | 7/2018 |
| CN | 110618568 A | 12/2019 |
| CN | 111323955 A | 6/2020 |
| JP | S61-3117 A | 1/1986 |
| JP | S63-278026 A | 11/1988 |
| JP | 2007-137699 A | 6/2007 |
| JP | 2009-122386 A | 6/2009 |

\* cited by examiner

DISPLAY PANEL AND CUTTING METHOD THEREOF, AND DISPLAY DEVICE

CROSS REFERENCE TO RELATED APPLICATION

The present disclosure claims the priority of the Chinese patent application filed on Apr. 7, 2020 before the Chinese Patent Office with the application number of 202010266642.1 and the title of "DISPLAY PANEL AND CUTTING METHOD THEREOF, AND DISPLAY DEVICE", which is incorporated herein in its entirety by reference.

TECHNICAL FIELD

The present disclosure relates to the technical field of display and, more particularly relates to a display panel and a cutting method thereof, and a display device.

BACKGROUND

At present, the proportion of borderless models in the market is getting higher and higher, and people's requirements for the appearance of borderless products are getting higher and higher. In conventional design, there will be a blank region of 0.2 mm to 0.3 mm from an edge of a display panel to an internal black matrix, which is used to isolate static electricity. Therefore, there will be a circle of white edges on a periphery of the display product. Meanwhile, a vertical grinding process is employed to eliminate a segment gap between edges of an array substrate and a color-film substrate.

In recent years, in order to reduce costs and save production capacity, ordinary display panels are often used as borderless display products.

SUMMARY

The present disclosure provides a display panel and a cutting method thereof, and a display device.

The present disclosure discloses a cutting method of a display panel, wherein the method comprises:
    along a first cutting line, cutting a color-film substrate of a to-be-cut display panel; and
    along a second cutting line, cutting an array substrate of the to-be-cut display panel to obtain a display panel;
    wherein, in a target direction parallel to the to-be-cut display panel, the second cutting line is located between the first cutting line and a display region of the to-be-cut display panel, and in the target direction, a distance between the first cutting line and the second cutting line is a preset distance.

Optionally, the color-film substrate comprises a first edge away from a lead region, the first cutting line comprises a first sub-cutting line away from the lead region, and the step of, along the first cutting line, cutting the color-film substrate of the to-be-cut display panel comprises:
    along the first sub-cutting line, cutting the first edge of the color-film substrate of the to-be-cut display panel.

Optionally, the array substrate comprises a second edge away from the lead region, the second cutting line comprises a second sub-cutting line away from the lead region, and the step of, along the second cutting line, cutting the array substrate of the to-be-cut display panel comprises:
    along the second sub-cutting line, cutting the second edge of the array substrate of the to-be-cut display panel;
    wherein, in the target direction, a distance between the first sub-cutting line and the second sub-cutting line is the preset distance.

Optionally, the color-film substrate further comprises a third edge and a fourth edge adjacent to the first edge, the first cutting line further comprises a third sub-cutting line and a fourth sub-cutting line adjacent to the first sub-cutting line, and the step of, along the first cutting line, cutting the color-film substrate of the to-be-cut display panel further comprises:
    along the third sub-cutting line, cutting the third edge of the color-film substrate of the to-be-cut display panel; and
    along the fourth sub-cutting line, cutting the fourth edge of the color-film substrate of the to-be-cut display panel.

Optionally, the array substrate further comprises a fifth edge and a sixth edge adjacent to the second edge, the second cutting line further comprises a fifth sub-cutting line and a sixth sub-cutting line adjacent to the second sub-cutting line, and the step of, along the second cutting line, cutting the array substrate of the to-be-cut display panel further comprises:
    along the fifth sub-cutting line, cutting the fifth edge of the array substrate of the to-be-cut display panel; and
    along the sixth sub-cutting line, cutting the sixth edge of the array substrate of the to-be-cut display panel;
    wherein, in the target direction, a distance between the third sub-cutting line and the fifth sub-cutting line is the preset distance, and a distance between the fourth sub-cutting line and the sixth sub-cutting line is the preset distance.

Optionally, the preset distance is greater than or equal to a preset cutting error precision and less than or equal to twice the preset cutting error precision.

Optionally, the preset cutting error precision is greater than or equal to 0.05 mm, and less than or equal to 0.09 mm.

Optionally, a cutter wheel is used to cut the to-be-cut display panel.

Optionally, along the first cutting line, an upper cutter wheel is used to cut the color-film substrate of the to-be-cut display panel.

Optionally, along the second cutting line, a lower cutter wheel is used to cut the array substrate of the to-be-cut display panel.

The present disclosure further discloses a display panel, wherein the display panel is obtained using the cutting method above.

Optionally, in the target direction parallel to the display panel, a distance between an edge of the color-film substrate and an edge of the array substrate is greater than or equal to a first threshold, and less than or equal to a second threshold; and
    the first threshold value is a difference between the preset distance and twice the preset cutting error precision, and the second threshold is a sum of the preset distance and twice the preset cutting error precision.

The present disclosure further discloses a display device, comprising the display panel above.

The above description is merely a summary of the technical solutions of the present disclosure. In order to more clearly know the technical means of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the prior art, the figures that are required to describe the embodiments or the prior art will be briefly introduced below. Apparently, the figures that are described below are some embodiments of the present disclosure, and a person skilled in the art can obtain other figures according to these figures without paying creative work.

DETAILED DESCRIPTION

In order to make the objects, the technical solutions and the advantages of the embodiments of the present disclosure clearer, the technical solutions of the embodiments of the present disclosure will be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

In order to make the above objects, features and advantages of the present disclosure be more clearly understood, the present disclosure will be described in further detail below with reference to the drawings and detailed description.

Before describing the embodiments of the present disclosure in detail, the existing cutting methods of display panels are first introduced.

Figure 1:
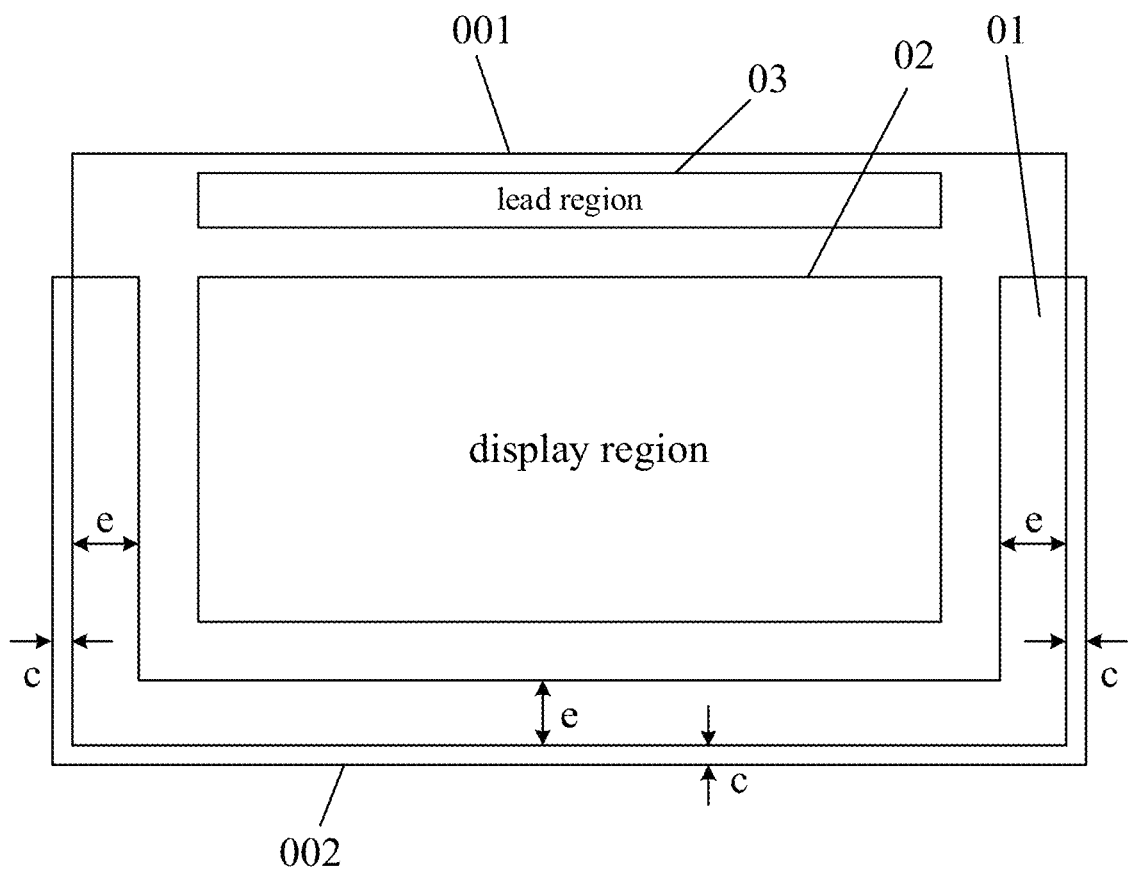
FIG. 1 illustrates a schematic diagram of a to-be-cut display panel.

FIG. 1 illustrates a schematic diagram of a to-be-cut display panel. Referring to FIG. 1, in conventional panel design, the panel edge comprises an isolation region 01 with a distance e (e is usually 0.2 mm to 0.3 mm), and one side of the isolation region 01 close to a display region 02 is a black matrix region, while one side of the isolation region 01 away from the display region 02, which is an edge part with a distance c in FIG. 1, is also a black matrix region. It should be noted that FIG. 1 is only an exemplary schematic diagram, which is used to assist in explaining the embodiments of the present disclosure, and the proportions of each region and distance in FIG. 1 do not limit the present disclosure.

In a solution, the isolation region 01 may be a blank region, so as to avoid that the black matrix is exposed at the edge of the panel, causing static electricity generated during cutting to be introduced into a liquid crystal cell through the black matrix, resulting in abnormal deflection of the liquid crystal and poor display. The blank region may disconnect an edge of the black matrix from the outside to cut off an introduction path of the static electricity and prevent the static electricity from entering the liquid crystal cell.

Figure 2:
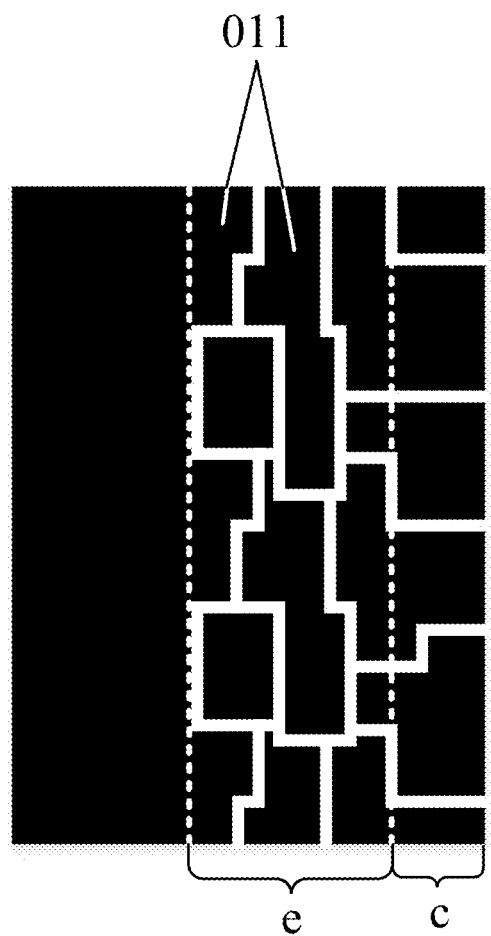
FIG. 2 illustrates a partial schematic diagram of an isolation region.

In another solution, the isolation region 01 may be provided with a shading matrix. FIG. 2 illustrates a partial schematic diagram of the isolation region 01, wherein the shading matrix of the isolation region 01 may comprise a plurality of unconnected shading structures 011. A base of a color-film substrate, which is usually a light-permeable transparent glass, is provided between the shading structures 011. A material of the shading structure 011 may be the same as that of the black matrix, so the shading matrix is similar to a black matrix mosaic. The shading matrix can not only shade the light, but also avoid introducing static electricity into the panel. Certainly, during actual application, the shading matrix may also be properly extended to an edge part with a distance c.

Figure 3:
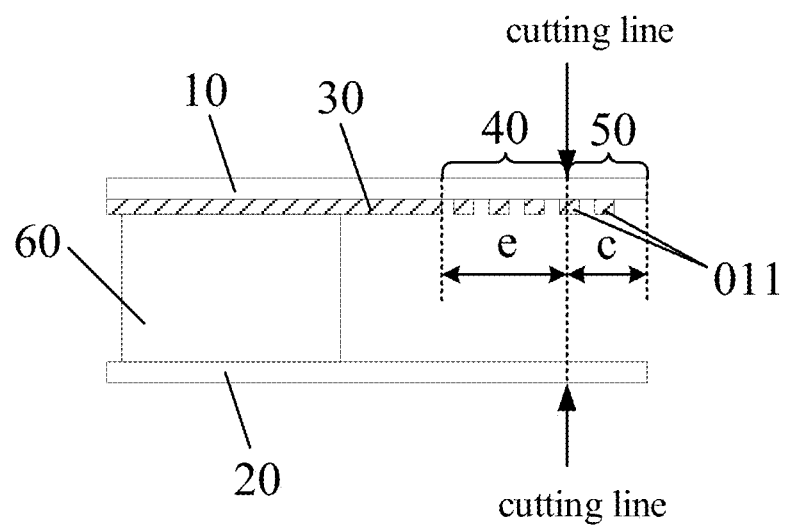
FIG. 3 illustrates a cutting design diagram of a to-be-cut display panel in the related art.

FIG. 3 illustrates a cutting design diagram of a to-be-cut display panel in the related art. In FIG. 3, 10 is a base of a color-film substrate, 20 is a base of an array substrate, 30 is a black matrix layer, 40 is an isolation region, 011 is a shading matrix, 50 is a to-be-cut part of the color-film substrate, and 60 refers to some regular structures between the color-film substrate and the array substrate, which will not be described in detail here. As shown in FIG. 3, in the design solution, the base of the color-film substrate and the base of the array substrate are cut at the same edge, and both are cut between the isolation region 40 and the to-be-cut part 50 of the color-film substrate.

Figure 4:
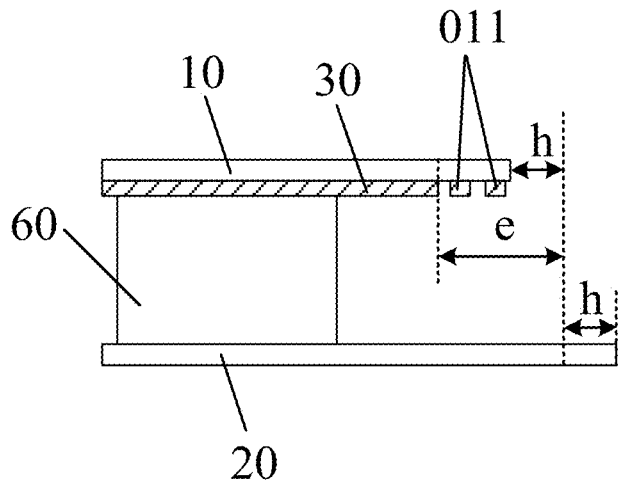
FIG. 4 illustrates a schematic diagram of a cut display panel in the related art.

However, there will be a certain cutting error in actual cutting, which will lead to cutting process fluctuation. The cutting error may be in a range of [−h, h], that is, the cutting error precision is h. FIG. 4 illustrates a schematic diagram of a cut display panel in the related art. When maximum cutting deviation occurs, there will be a limit case of producing a step edge of 2h. In the limit case shown in FIG. 4, the base edge of the array substrate is exposed for 2h relative to the base edge of the color-film substrate. Since the isolation region 40 can transmit light (when the isolation region is a blank region, light can be penetrated; or, when the isolation region has shading matrixes, light can be penetrated between the shading matrixes), if metal parts of the array substrate (such as metal test lines, metal identities, or the like) are not in an exposed part, the light leakage at the panel edge will make the panel edge present a white border. If the metal parts of the array substrate are in the exposed part, the metal parts reflect the light leakage of the panel edge, which will make the panel edge present a bright border. In this way, the light leakage problem of white border or bright border will occur in the cut display panel.

To sum up, aiming at the existing display panel cutting solution, the cutting method of the display panel in the embodiments of the present disclosure is proposed to solve the light leakage problem of the white border or bright border occurred to the existing display panel.

Figure 5:
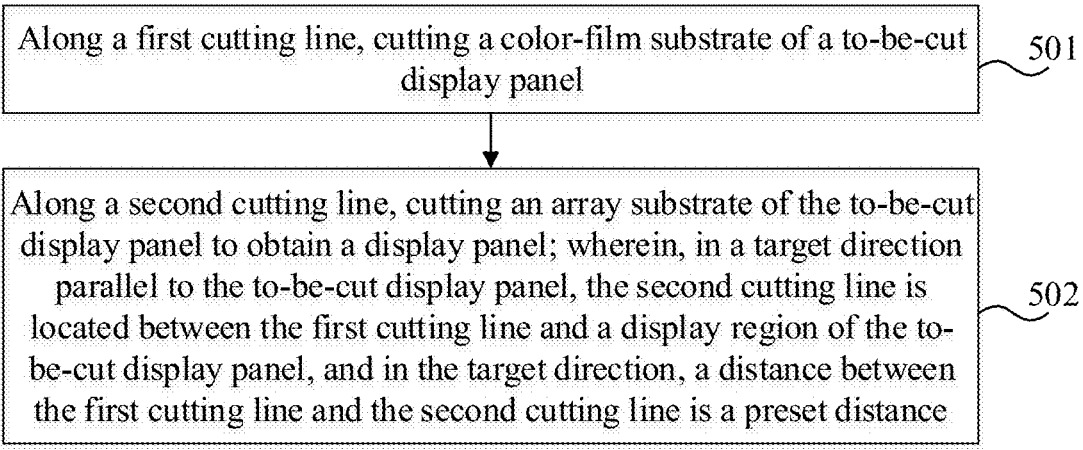
FIG. 5 illustrates a flow chart of steps of a cutting method of a display panel according to an embodiment of the present disclosure.

FIG. 5 illustrates a flow chart of steps of a cutting method of a display panel according to an embodiment of the present disclosure. The cutting method comprises the following steps:

Step 501: along a first cutting line, cutting a color-film substrate of a to-be-cut display panel.

In the embodiment of the present disclosure, the color-film substrate may comprise a first edge 101 away from a lead region 03 (fanout region). In actual application, the lead region 03 is close to a side 001 close to a data drive board (Data Pad, DP). Therefore, the first edge 101 is namely an edge of the color-film substrate close to a side 002 away from the data drive board (Data Pad Opposite, DPO).

Figure 6:
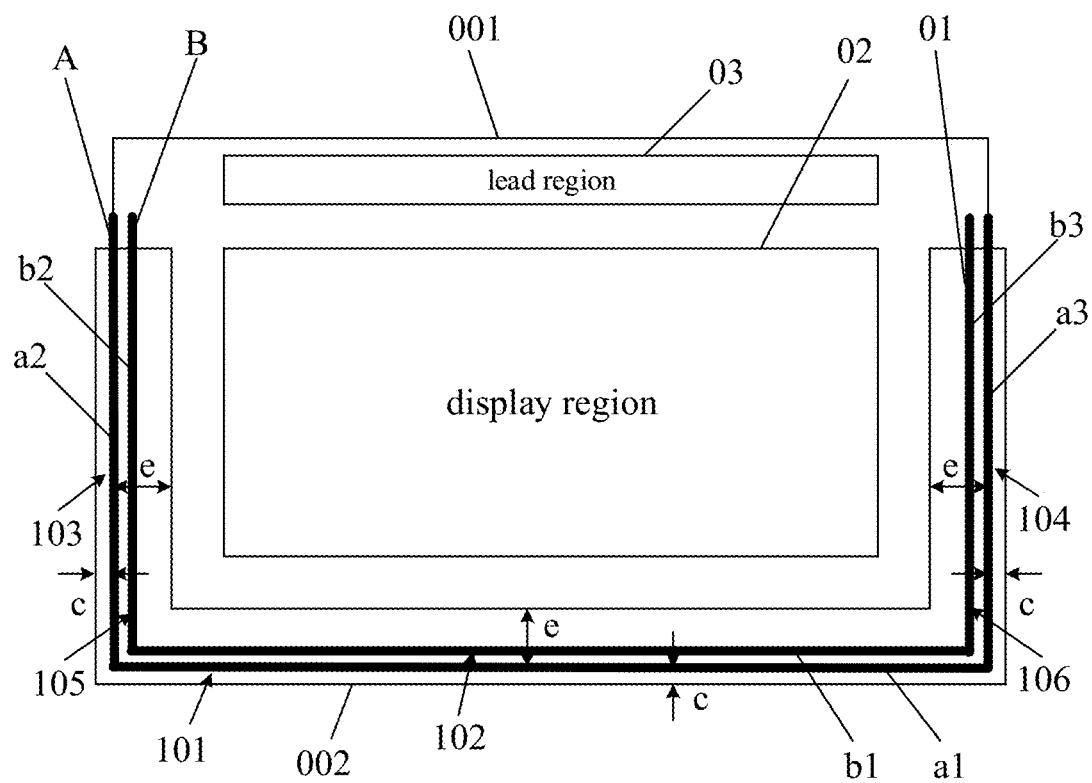
FIG. 6 illustrates a schematic diagram of a cutting line according to an embodiment of the present disclosure.

Accordingly, FIG. 6 illustrates a schematic diagram of a cutting line according to an embodiment of the present disclosure. A first cutting line A may comprise a first sub-cutting line a1 away from the lead region 03, then this step may specifically comprise the following step of:

along the first sub-cutting line a1, cutting the first edge 101 of the color-film substrate of the to-be-cut display panel.

Referring to FIG. 6, the color-film substrate may also comprise a third edge 103 and a fourth edge 104 adjacent to the first edge 101. Accordingly, the first cutting line A may also comprise a third sub-cutting line a2 and a fourth sub-cutting line a3 adjacent to the first sub-cutting line a1, then this step may specifically comprise the following steps of:

along the third sub-cutting line a2, cutting the third edge 103 of the color-film substrate of the to-be-cut display panel; and along the fourth sub-cutting line a3, cutting the fourth edge 104 of the color-film substrate of the to-be-cut display panel.

It should be noted that the cutting order of the first edge 101, the third edge 103 and the fourth edge 104 is not specifically limited in the embodiments of the present disclosure.

Step 502: along a second cutting line, cutting an array substrate of the to-be-cut display panel to obtain a display panel; wherein, in a target direction parallel to the to-be-cut display panel, the second cutting line is located between the first cutting line and a display region of the to-be-cut display panel, and in the target direction, a distance between the first cutting line and the second cutting line is a preset distance.

In the embodiments of the present disclosure, the distance between the first cutting line A and the second cutting line B refers to the nearest spacing between the first cutting line A and the second cutting line B. The second cutting line B is located between the first cutting line A and the display region 02 of the to-be-cut display panel, that is, the first cutting line A is located at A periphery of the second cutting line B.

The array substrate may comprise a second edge 102 away from the lead region 03, and, the second edge 102 is namely an edge of the array substrate close to a DPO side 002. Accordingly, referring to FIG. 6, the second cutting line B may comprise a second sub-cutting line b1 away from the lead region 03, and this step may specifically comprise the following step of:

and along the second sub-cutting line b1, cutting the second edge 102 of the array substrate of the to-be-cut display panel;

wherein, in a target direction D, a distance between the first sub-cutting line a1 and the second sub-cutting line b1 is a preset distance d.

Referring to FIG. 6, the array substrate may also comprise a fifth edge 105 and a sixth edge 106 adjacent to the second edge 102. Accordingly, the second cutting line B may also comprise a fifth sub-cutting line b2 and a sixth sub-cutting line b3 adjacent to the second sub-cutting line b1, then this step may specifically comprise the following steps of:

along the fifth sub-cutting line b2, cutting the fifth edge 105 of the array substrate of the to-be-cut display panel; and along the sixth sub-cutting line b3, cutting the sixth edge 106 of the array substrate of the to-be-cut display panel;

wherein, in the target direction D, a distance between the third sub-cutting line a2 and the fifth sub-cutting line b2 is the preset distance d, and a distance between the fourth sub-cutting line a3 and the sixth sub-cutting line b3 is the preset distance d.

It should be noted that the cutting order of the second edge 102, the fifth edge 105 and the sixth edge 106 is not specifically limited in the embodiments of the present disclosure.

Moreover, the cutting order of the color-film substrate and the array substrate is not specifically limited in the embodiments of the present disclosure.

Figure 7:
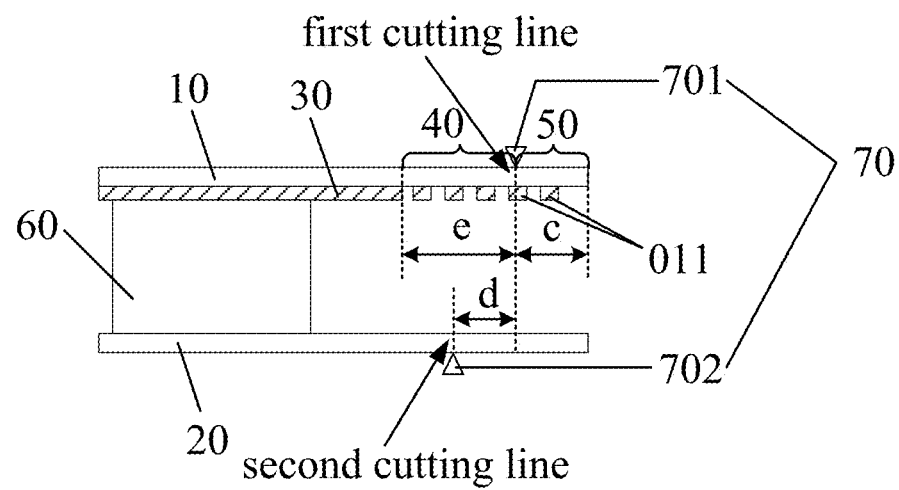
FIG. 7 illustrates a cutting design diagram of a to-be-cut display panel according to an embodiment of the present disclosure.

FIG. 7 illustrates a cutting design diagram of a to-be-cut display panel according to an embodiment of the present disclosure. Referring to FIG. 7, during design, compared with the related art above, the cutting line of the array substrate may be moved inward by the preset distance d, and the cutting line of the color-film substrate is unchanged, so that the light leakage phenomenon of white border or bright border can be improved in case of cutting process fluctuation.

Specifically, when a cutting error is in a range of $[-h, h]$, and maximum cutting deviation is generated, two limit cases may exist.

Figure 8:
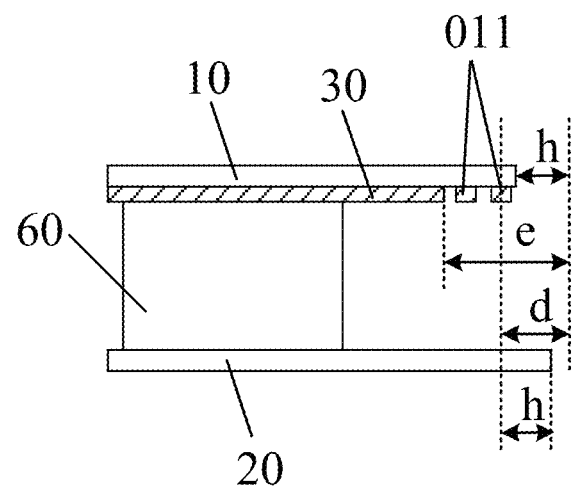
FIG. 8 illustrates a schematic diagram of a to cut display panel according to an embodiment of the present disclosure.

FIG. 8 illustrates a cut display panel corresponding to a first limit case according to an embodiment of the present disclosure. In the limit case shown in FIG. 8, a base edge of the array substrate is exposed (2h−d) relative to a base edge of the color-film substrate, that is, a distance between the edge of the color-film substrate and the edge of the array substrate is (d−2h). Compared with FIG. 4, the exposed part of the array substrate is reduced, so the light leakage phenomenon of white border or bright border can be improved regardless of the display panel where the isolation region is a blank region or the display panel where the isolation region comprises a shading matrix.

Figure 9:
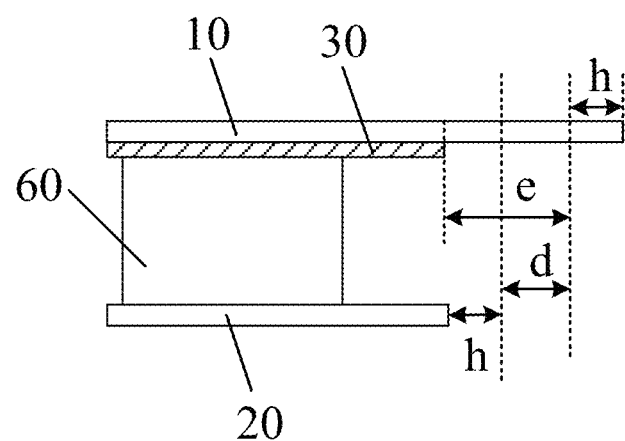
FIG. 9 illustrates a schematic diagram of another cut display panel according to an embodiment of the present disclosure.

FIG. 9 illustrates a cut display panel corresponding to a second limit case according to an embodiment of the present disclosure. In the limit case shown in FIG. 9, a base edge of the array substrate is not exposed relative to a base edge of the color-film substrate, but the base edge of the color-film substrate is exposed relative to the base edge of the array substrate, that is, a distance between the edge of the color-film substrate and the edge of the array substrate is (2h+d). Compared with FIG. 4, the array substrate will not be exposed on the color-film substrate, so the light leakage phenomenon of white border or bright border can be improved regardless of the display panel where the isolation region is a blank region or the display panel where the isolation region comprises a shading matrix.

In addition, optionally, the preset distance d may be greater than or equal to a preset cutting error precision h, and less than or equal to twice the preset cutting error precision h, that is, $h \le d \le 2h$. In practical application, the preset cutting error precision h may be adjusted by cutting process.

Optionally, the preset cutting error precision h may be greater than or equal to 0.05 mm, and less than or equal to 0.09 mm, that is, 0.05 mm≤h≤0.09 mm. Generally, the smaller the preset cutting error precision h is, the better.

In specific application, 0.05 mm≤h≤0.09 mm, and h≤d≤2h can make the step caused by the cutting process fluctuation to be less than or equal to 0.3 mm, which can meet a subsequent module process and reduce a risk of cracking in the subsequent composition of the display module.

In practical application, the to-be-cut display panel may be cut through a cutter wheel 70. Specifically, the color-film substrate of the to-be-cut display panel may be cut along the first cutting line through an upper cutter wheel 701, and the array substrate of the to-be-cut display panel may be cut along the second cutting line through a lower cutter wheel 702.

It should be noted that a borderless display panel is usually cut on three sides, and a panel edge on a DP side is not cut. Therefore, by cutting the first edge 101, the third edge 103 and the fourth edge 104 of the color-film substrate and cutting the second edge 102, the fifth edge 105 and the sixth edge 106 of the array substrate, the cut display panel may be used as a display panel of a borderless product.

In the embodiments of the present disclosure, the color-film substrate of the to-be-cut display panel may be cut along the first cutting line, and the array substrate of the to-be-cut display panel may be cut along the second cutting line to obtain the display panel. In a target direction parallel to the to-be-cut display panel, the first cutting line is located at one side of the second cutting line away from the display region of the to-be-cut display panel, and in the target direction, the distance between the first cutting line and the second cutting line is the preset distance. In the embodiments of the present disclosure, relative to the first cutting line corresponding to the color-film substrate, the second cutting line corresponding to the array substrate may be moved inward by the preset distance. In this way, in a case of cutting process fluctuation, the exposed region of the edge of the array substrate can be reduced, and the light leakage phenomenon of white border or bright border at the edge of the display panel can be improved.

The embodiments of the present disclosure further disclose a display panel, wherein the display panel is obtained using the cutting method above.

The display panel comprises a color-film substrate and an array substrate. Optionally, in a target direction parallel to the display panel, a distance between an edge of the color-film substrate and an edge of the array substrate is greater than or equal to a first threshold, and less than or equal to a second threshold; and the first threshold value is a difference between the preset distance and twice the preset cutting error precision, and the second threshold is a sum of the preset distance and twice the preset cutting error precision.

In the embodiments of the present disclosure, referring to FIG. 8 and FIG. 9, the to-be-cut display panel is cut according to the cutting method provided by the embodiments above. Even if cutting process fluctuation occurs, the distance between the edge of the color-film substrate and edge of the array substrate of the obtained display panel can be less than or equal to the first threshold (d−2h), and greater than or equal to the second threshold (2h+d), which means that the distance between the edge of the color-film substrate and the edge of the array substrate edge does not exceed a scope of [d−2h, 2h+d]. Compared with the related art in which the distance between the edge of the color-film substrate and the edge of the array substrate does not exceed a range of [−2h, 2h], in the display panel provided by the embodiments of the present disclosure, a step fluctuation range between the edge of the color-film substrate and the edge of the array substrate is smaller, the exposed region of the edge of the array substrate is reduced, and the defects of bright border and white border are improved.

In the embodiments of the present disclosure, the color-film substrate of the to-be-cut display panel may be cut along the first cutting line, and the array substrate of the to-be-cut display panel may be cut along the second cutting line to obtain the display panel. In a target direction parallel to the to-be-cut display panel, the first cutting line is located at one side of the second cutting line away from the display region of the to-be-cut display panel, and in the target direction, the distance between the first cutting line and the second cutting line is the preset distance. In the embodiments of the present disclosure, relative to the first cutting line corresponding to the color-film substrate, the second cutting line corresponding to the array substrate may be moved inward by the preset distance. In this way, in a case of cutting process fluctuation, the exposed region of the edge of the array substrate can be reduced, and the light leakage phenomenon of white border or bright border at the edge of the display panel can be improved.

The embodiments of the present disclosure further disclose a display device, comprising the display panel above.

In the embodiments of the present disclosure, a color-film substrate of the to-be-cut display panel may be cut along a first cutting line, and an array substrate of the to-be-cut display panel may be cut along a second cutting line to obtain a display panel. In a target direction parallel to the to-be-cut display panel, the first cutting line is located at one side of the second cutting line away from a display region of the to-be-cut display panel, and in the target direction, a distance between the first cutting line and the second cutting line is a preset distance. In the embodiments of the present disclosure, relative to the first cutting line corresponding to the color-film substrate, the second cutting line corresponding to the array substrate may be moved inward by a preset distance. In this way, in a case of cutting process fluctuation, an exposed area of the edge of the array substrate can be reduced, and the light leakage phenomenon of white border or bright border at the edge of the display panel can be improved.

For the method embodiments mentioned above, for ease of description, the method embodiments are all expressed as a series of action combinations, but a person skilled in the art should understand that the embodiments of the present disclosure are not limited by the described action sequences, because certain steps may be performed in other sequences or concurrently. Secondly, a person skilled in the art should also understand that all the embodiments described in the specification are alternative embodiments, and the actions and modules involved are not necessarily required by the embodiments of the present disclosure.

The embodiments in the present disclosure are all described step by step, the important part of each embodiment mainly lies in the difference between other embodiments, the same or similar part between each embodiment may be referred to each other.

Finally, it should be also noted that relational terms herein such as first and second, etc., are used merely to distinguish one entity or operation from another entity or operation, and do not necessarily require or imply there is any such relationship or order between these entities or operations. Furthermore, the terms "including", "comprising" or any variations thereof are intended to embrace a non-exclusive inclusion, such that a process, a method, a commodity, or a device including a series of elements, includes not only those elements but also includes other elements not expressly listed, or also includes elements inherent to such process, method, commodity, or device. Unless otherwise specified, an element limited by "include a/an . . . " does not exclude other same elements existing in the process, the method, the article, or the device that includes the element.

The display panel and the cutting method thereof, and the display device provided by the present disclosure are described in detail above. Specific examples are applied to explain the principle and implementation of the present disclosure herein. The above embodiments are only used to help understand the method of the present disclosure and the core idea thereof. Meanwhile, for a person skilled in the art, there will be changes in the specific implementation and application scope according to the idea of the present disclosure. To sum up, the contents of this specification should not be construed as limiting the present disclosure.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Part or all modules therein may be selected according to actual needs to realize the objective of achieving the technical solution of the embodiment. Those of ordinary skills in the art can understand and implement the technical solutions without paying creative work.

The "one embodiment", "an embodiment" or "one or more embodiments" as used herein means that particular features, structures or characteristics described with reference to an embodiment are included in at least one embodiment of the present disclosure. Moreover, it should be noted that here an example using the wording "in an embodiment" does not necessarily refer to the same one embodiment.

Many details are discussed in the specification provided herein. However, it can be understood that the embodiments of the present disclosure may be implemented without those concrete details. In some of the embodiments, well-known processes, structures and techniques are not described in detail, so as not to affect the understanding of the description.

Finally, it should be noted that the above embodiments are merely intended to explain the technical solutions of the present disclosure, and not to limit them. Although the present disclosure is explained in detail by referring to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present disclosure.

The invention claimed is:

1. A cutting method of a display panel, wherein the method comprises:
    along a first cutting line, cutting a color-film substrate of a to-be-cut display panel; and
    along a second cutting line, cutting an array substrate of the to-be-cut display panel to obtain a display panel;
    wherein, in a target direction perpendicular to an edge of the to-be-cut display panel, the second cutting line is located between the first cutting line and a display region of the to-be-cut display panel, and in the target direction, a distance between the first cutting line and the second cutting line is a preset distance,
    wherein the color-film substrate comprises a first edge away from a lead region, the first cutting line comprises a first sub-cutting line away from the lead region, and the step of, along the first cutting line, cutting the color-film substrate of the to-be-cut display panel comprises:
    along the first sub-cutting line, cutting the first edge of the color-film substrate of the to-be-cut display panel,
    wherein the color-film substrate further comprises a third edge and a fourth edge adjacent to the first edge, the first cutting line further comprises a third sub-cutting line and a fourth sub-cutting line adjacent to the first sub-cutting line, and the step of, along the first cutting line, cutting the color-film substrate of the to-be-cut display panel further comprises:
    along the third sub-cutting line, cutting the third edge of the color-film substrate of the to-be-cut display panel; and
    along the fourth sub-cutting line, cutting the fourth edge of the color-film substrate of the to-be-cut display panel.

2. The method according to claim 1, wherein the array substrate comprises a second edge away from the lead region, the second cutting line comprises a second sub-cutting line away from the lead region, and the step of, along the second cutting line, cutting the array substrate of the to-be-cut display panel comprises:
    along the second sub-cutting line, cutting the second edge of the array substrate of the to-be-cut display panel;
    wherein, in the target direction, a distance between the first sub-cutting line and the second sub-cutting line is the preset distance.

3. The method according to claim 1, wherein the array substrate further comprises a fifth edge and a sixth edge adjacent to the second edge, the second cutting line further comprises a fifth sub-cutting line and a sixth sub-cutting line adjacent to the second sub-cutting line, and the step of, along the second cutting line, cutting the array substrate of the to-be-cut display panel further comprises:
    along the fifth sub-cutting line, cutting the fifth edge of the array substrate of the to-be-cut display panel; and
    along the sixth sub-cutting line, cutting the sixth edge of the array substrate of the to-be-cut display panel;
    wherein, in the target direction, a distance between the third sub-cutting line and the fifth sub-cutting line is the preset distance, and a distance between the fourth sub-cutting line and the sixth sub-cutting line is the preset distance.

4. The method according to claim 1, wherein the preset distance is greater than or equal to a preset cutting error precision, and less than or equal to twice the preset cutting error precision.

5. The method according to claim 4, wherein the preset cutting error precision is greater than or equal to 0.05 mm and less than or equal to 0.09 mm.

6. The method according to claim 1, wherein a cutter wheel is used to cut the to-be-cut display panel.

7. The method according to claim 6, wherein, along the first cutting line, an upper cutter wheel is used to cut the color-film substrate of the to-be-cut display panel.

8. The method according to claim 6, wherein, along the second cutting line, a lower cutter wheel is used to cut the array substrate of the to-be-cut display panel.

* * * * *